March 3, 1936.  G. BROULHIET  2,032,975
SUSPENSION DEVICE FOR AUTOMOBILES
Filed Feb. 26, 1935  3 Sheets-Sheet 1

Inventor:
GeorgesBroulhiet
Attorneys:

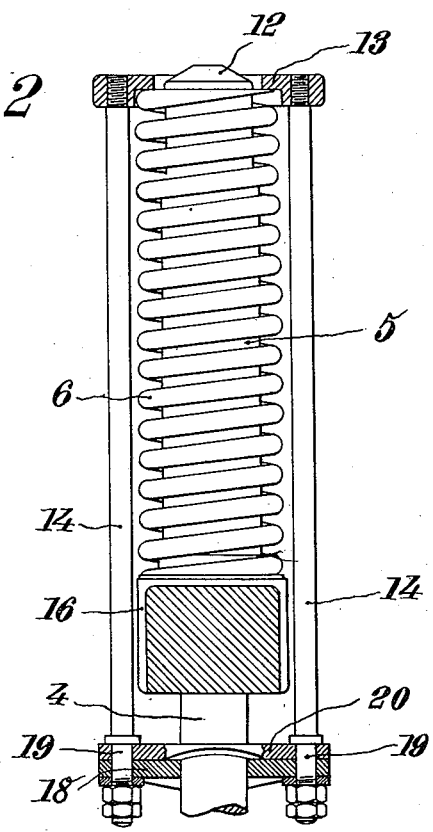
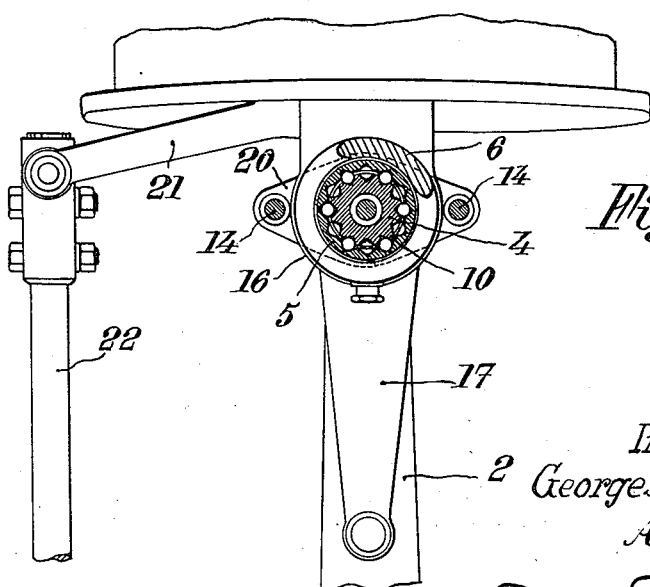

March 3, 1936.　　　　G. BROULHIET　　　2,032,975
SUSPENSION DEVICE FOR AUTOMOBILES
Filed Feb. 26, 1935　　　3 Sheets-Sheet 3
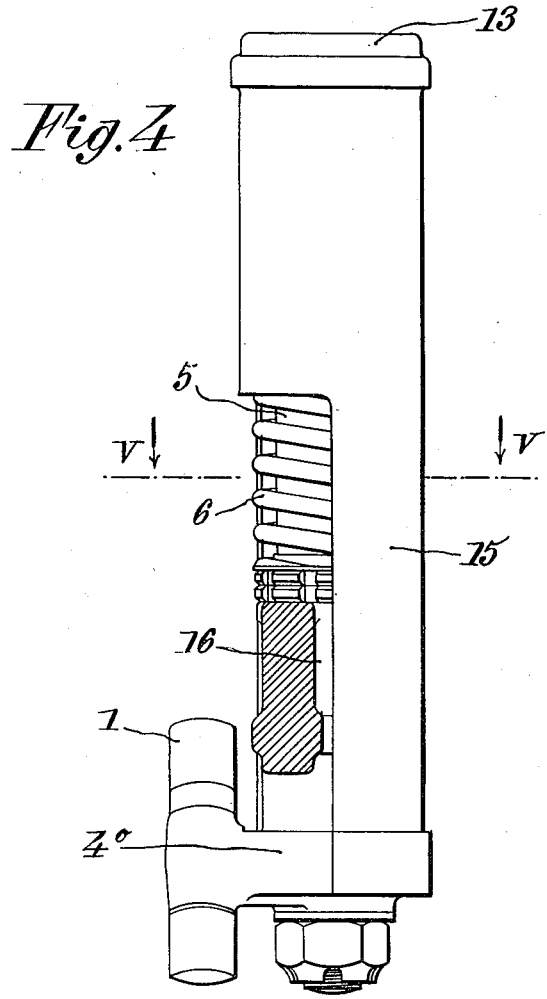
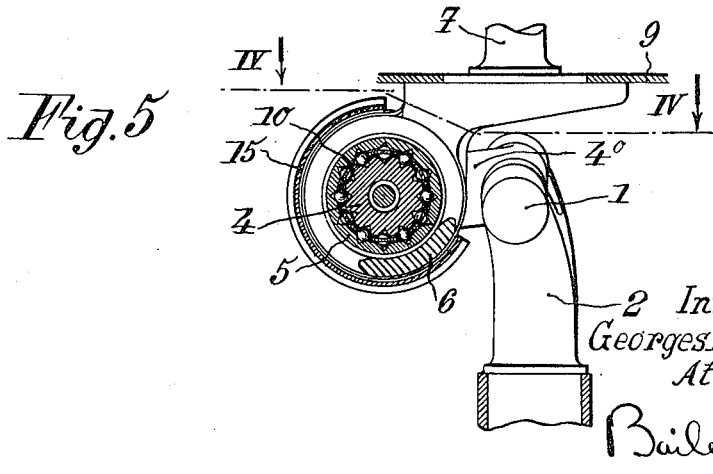
Inventor:
Georges Broulhiet
Attorneys:

Patented Mar. 3, 1936

2,032,975

UNITED STATES PATENT OFFICE 2,032,975

SUSPENSION DEVICE FOR AUTOMOBILES

Georges Broulhiet, Paris, France

Application February 26, 1935, Serial No. 8,365
In Belgium February 28, 1934

11 Claims. (Cl. 280—96.2)

The present invention relates to arrangements of automobile vehicle independent wheels in which the stub axle of the wheel is carried by an element adapted to slide, against the action of a suspension device, with respect to a guide adapted to pivot, about a substantially vertical axis, with respect to the frame of the vehicle.

The object of the present invention is to provide an arrangement of this kind which is better adapted to meet the requirements of actual practice than other devices of the same kind used up to the present time.

An essential feature of the present invention consists in providing, between said guide and said element, rolling members, such for instance as balls, or rollers, suitably engaging grooves or the like provided in both said guide and said member, so as to transmit from one to the other pivoting movements about a common vertical axis, while reducing the frictional stresses resulting from the relative sliding displacements of said parts.

Other features of the present invention will result from the following detailed description of specific embodiments of said invention.

Preferred embodiments of the present invention will be hereinafter described, with reference to the accompanying drawings, given merely by way of example, and in which:

Fig. 2 is a sectional view on the line II—II of Fig. 1;

Fig. 3 is a horizontal sectional view on the line III—III of Fig. 1;

Fig. 4 is a view of another embodiment of the device according to the present invention, in section on the line IV—IV of Fig. 5; and Fig. 5 is horizontal sectional view on the line V—V of Fig. 4.

Figure 1:
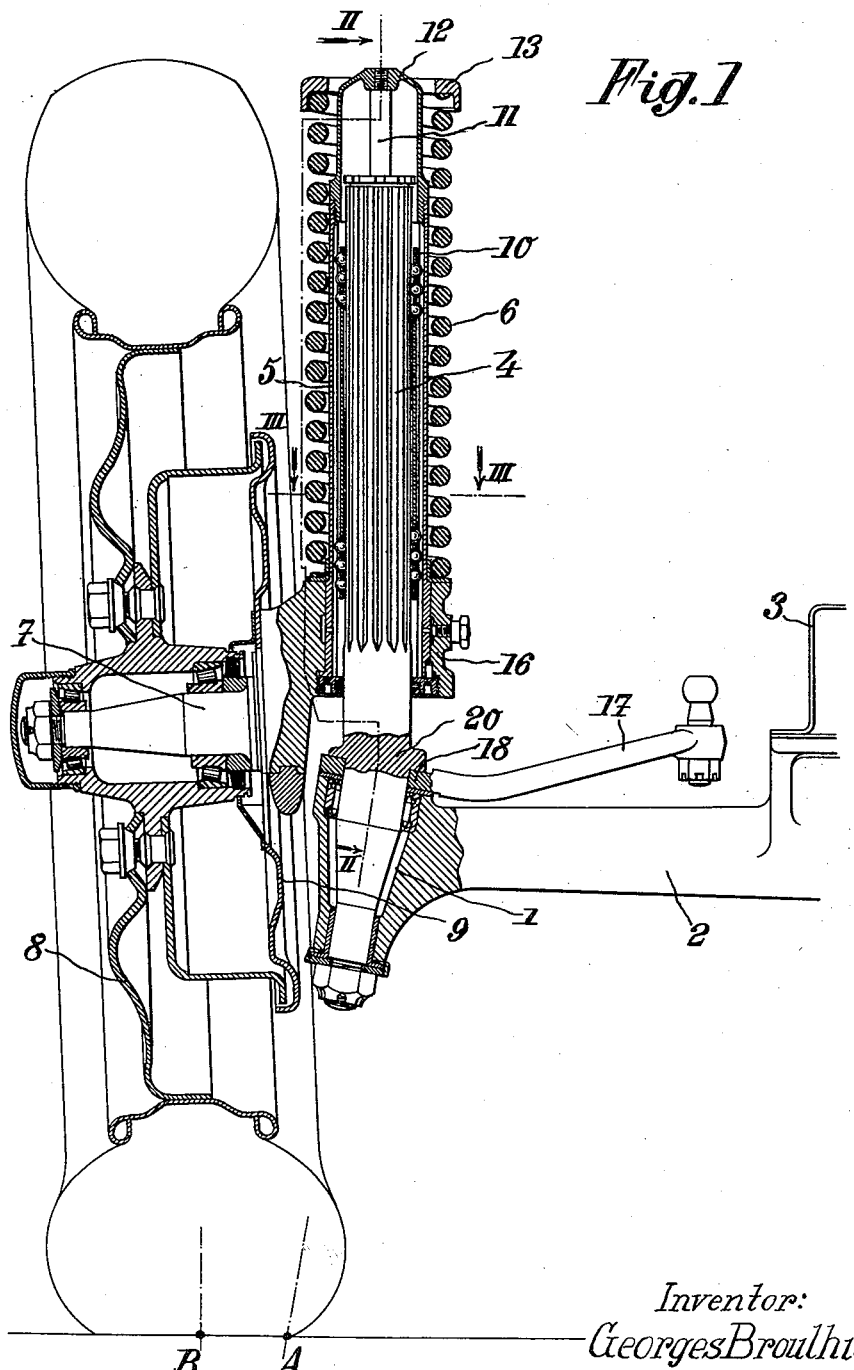
Fig. 1 is a vertical sectional view of a first embodiment of the device according to the present invention.

According to the present invention, at the place where are located the pivots of the wheel stub axles of a vehicle having an ordinary front axle, I provide pivots I each adapted to permit the pivoting of one of the front wheels.

For instance, these pivots are provided at the ends of a cross member 2 rigidly fixed at the front part of the chassis frame of the vehicle.

In the embodiment of Figs. 1, 2 and 3, each of these pivots consists of a sleeve in which the end of a spindle may be journalled.

In the embodiment of Figs. 4 and 5, each of these pivots consists of two parts in which a suitable spindle may be journalled.

Each of these pivots carries a guide 4 arranged in such manner that when the vehicle is running along a straight line, said guide is located in a plane which is substantially vertical and parallel to the axial longitudinal plane of the vehicle. Preferably this guide is so devised that it is in a vertical position when the vehicle is running along a straight line.

On this guide 4 there is slidably mounted an element 5 supported by a suspension system 6, said element 5 being made rigid with the stub axle 7 of wheel 8.

On this element 5 is fixed the non-rotating part 9 of the brake with which wheel 8 is to be provided.

Finally, I provide means for controlling the rotation of the wheels about their pivots I.

Of course, the various organs of the system above described may be devised in many different ways.

Concerning guide 4, it preferably consists of a kind of rod which is disposed either under pivot I, or laterally with respect thereto (embodiment of Figs. 4 and 5), for instance in front thereof or behind said pivot, or again, and preferably, above said pivot (embodiment of Figs. 1, 2 and 3).

In either case, guide 4 is preferably arranged in an exactly vertical position, while the wheel is slightly dished and the axis of pivot I is inclined outwardly toward the bottom so that said axis intersects the ground at a point A which is not very far from the center B of the area of contact of the wheel with the ground (Fig. 1). These points A and B may even coincide.

If guide 4 is to be disposed laterally with respect to pivot I, said guide has for instance, rigid with it, a horizontal arm 4⁰ the free end of which is journalled in pivot I. Of course, in this case, arm 4⁰ is made as short as possible in order that the overhang of the stub axle of the wheel with respect to arm 4 may be as small as possible. This arrangement is shown in Figs. 4 and 5.

If, on the contrary, guide 4 is to be disposed directly above the pivot, the spindle element that is journalled in said pivot and guide 4 (which is preferably made integral with said spindle element) are given the shape of a slightly bent rod, as shown in Fig. 1.

Concerning now the mounting of element 5 on guide 4, I provide rolling elements, such for instance as balls or rollers, between these parts so as to reduce to a minimum the frictional stresses between element 5 and guide 4 when the wheel is moved in the vertical direction with respect to the chassis frame.

Advantageously, element 5 is given the shape of a sleeve adapted to engage on guide 4. In the inner wall of said sleeve 5 and in the outer wall of guide 4 I provide longitudinal grooves adapted to receive balls, preferably maintained in position by means of at least one sleeve 10.

As each ball is housed in opposite grooves provided in guide 4 and sleeve 5 respectively, these parts are angularly fixed together. This connection will be particularly satisfactory when the grooves are given a dihedral cross section (for instance with an angle of 90°), as shown in Fig. 3, or any other shape such that, under the effect of a pressure compressing a ball between guide 4 and sleeve 5, said ball is compelled to assume a position such that said elements are angularly connected with each other.

This condition will be complied with whenever each ball, when compressed between the guide and the sleeve, has two points of contact with each of the grooves in which it is located, these points of contact being located respectively on either side of a radial plane passing through the center of the guide and the center of the ball that is considered.

The guide and the sleeve may be given any suitable shape in horizontal cross section. Preferably this section is circular. But it may include elements of straight lines. For instance it may be substantially square-shaped. In the latter case, it will be readily understood that the balls may be replaced by rollers.

In any case, the cooperating walls of the guide and of the sleeve will be made of a very hard metal, for instance a special steel.

Concerning now the suspension device, it includes a shock absorbing system and a spring system or the like.

Said shock absorbing system consists advantageously of a hydraulic apparatus which is lodged inside guide 4. A rod 11, fixed at one end to the corresponding end of the sleeve that constitutes element 5 penetrates into guide 4 and operates a suitable device.

The spring system may include, for instance, either a transverse leaf spring the ends of which are fixed through small connecting rods to elements 5, or, preferably, at least one spiral spring 6 interposed between guide 4 and element 5, preferably on the outside of said element.

Spring 6 bears, at its lower part, against a flange provided close to the bottom of element 5, and, at its upper part, against a plate 13 connected to the lower part of guide 4 through longitudinal connecting means which may consist either of rods 14 (Fig. 2) or of a kind of tube 15 slipped over spring 6 (Figs. 4 and 5).

This element 5 is made rigid with stub axle 7. For instance, this stub axle may be made integral with a kind of ring 16 adapted to be slipped over guide 4 and to which said sleeve 5 is fixed through any suitable means.

Concerning now the means for controlling the pivoting movements of the wheels about pivots 1 respectively, they advantageously include, on the one hand, a device for providing a connection between the steering gear and at least one of said wheels, and, on the other hand, eventually, a device for interconnecting the two wheels of a pair together.

The first mentioned device may be caused to act either on element 5, or, preferably, on guide 4.

In the latter case, the pivoting movement of the wheel about the corresponding pivot 1 under the effect of the steering gear is transmitted through the sliding arrangement provided between guide 4 and sleeve 5. But arm 17, through which the pivoting movements are transmitted, is not subjected to the vertical displacements of the wheel, which is a considerable advantage.

In the case of the mechanism shown in Figs. 1 to 3, this arm 17 is, for instance, made rigid with a ring shaped part 18 adapted to be slipped over the spindle element that is journalled in pivot 1 before said spindle element is inserted into pivot 1. Advantageously, this part 18 will be fixed in position by means of bolts 19 holding it against a shoulder 20 provided at the place where guide 4 is joined to the spindle element in question. These bolts may for instance consist of the ends of the rods 14 above referred to, which are thus fixed in position at the same time as ring-shaped part 18.

As for the device for interconnecting the two wheels of a pair it may be interposed either between the two guides 4 of the axle, or, preferably, between the corresponding elements 5.

In the latter case, each of these elements carries a lever 21, and the ends of these levers 21 are connected together by means of a connecting rod 22, which may be wholly similar to the tie rod employed in connection with ordinary axles.

Owing to this arrangement, the braking efforts, which tend to pivot the wheels outwardly, act on connecting rod 22 (transmitting tensile stresses to said rod if it is located in front of the axle) without producing any tendency to a relative rotation between guides 4 and elements 5 respectively. The balls, or other rolling means, interposed between each guide 4 and the corresponding member 5, are not called upon to support the stresses that would be imposed on them when the vehicle is braked, if the connecting device was interposed between guides 4.

It is believed that, in view of the preceding explanations, the working of the system of independent wheels above described is sufficiently clear for making it unnecessary to describe this working.

The device according to the present invention is particularly simple and compact, and it makes it possible to house, under the best possible conditions, all the elements that it includes, for instances the shock absorbing mechanism.

Owing to its very structure, the device according to the present invention is perfectly protected against shocks and against dirt since it is possible to provide stopping means between the orifice of the sleeve that carries the stub axle and guide 4.

This arrangement makes it possible to reduce as much as desired, even down to zero, the distance between points A and B.

Finally, owing to the presence of the balls and rollers which reduce the frictional stresses between guides 4 and members 5 respectively, the arrangement according to the present invention makes it possible to obtain a perfect angular connection between said parts, a result which could be otherwise obtained only by the provision of several guides spaced apart from one another and which would have to be kept in accurate parallel relation with respect to one another.

While I have, in the above description, disclosed what I deem to be practical and efficient embodiments of the present invention, it should be well understood that I do not wish to be limited thereto as there might be changes made in the arrangement, disposition and form of the parts, without departing from the principle of the present invention as comprehended within the scope of the appended claims.

What I claim is:

1. In a vehicle, the combination of a frame, an upright elongated guide pivoted to said frame about a substantially vertical axis, a wheel, a wheel stub axle, an element rigid with said stub axle slidably engaging said guide so as to permit relative sliding displacements of said element and said guide parallelly to said guide, suspension means between said element and said guide for elastically opposing said sliding displacements in at least one direction, the adjacent faces of said element and said guide being provided with grooves running in the longitudinal direction of said guide, rolling members engaging each partly in one groove of said guide and partly in a corresponding groove of said element, so as to prevent relative rotary displacements of said element and said guide about an axis parallel to said guide while reducing frictional stresses in the sliding displacements, and means for controlling the pivoting displacements of said guide and said element with respect to said frame.

2. In a vehicle, the combination of a frame, an upright elongated guide pivoted to said frame about an axis making a small angle with said guide, a wheel, a wheel stub axle, an element rigid with said stub axle and slidably engaging said guide so as to permit relative sliding displacements of said element and said guide parallelly to said guide, suspension means between said element and said guide for elastically opposing said sliding displacements in at least one direction, the adjacent faces of said element and said guide being provided with grooves running in the longitudinal direction of said guide, rolling members engaging each partly in one groove of said guide and partly in a corresponding groove of said element, so as to prevent relative rotary displacements of said element and said guide about an axis parallel to said guide while reducing frictional stresses in the sliding displacements, and means for controlling the pivoting displacements of said guide and said member with respect to said frame.

3. A combination according to claim 2 in which the axis about which said guide is pivoted to said frame is slightly inclined in an outward and downward direction with respect to the vehicle.

4. In a vehicle, the combination of a frame, an upright elongated guide pivoted to said frame, a wheel, a wheel stub axle, an element rigid with said stub axle slidably engaging said guide so as to permit relative sliding displacements of said element and said guide parallelly to said guide, suspension means between said element and said guide for elastically opposing said sliding displacements in at least one direction, the adjacent faces of said element and said guide respectively being provided with grooves of V-shaped section running in the longitudinal direction of said guide, balls engaging each partly in one groove of said guide and partly in a corresponding groove of said element, so as to prevent relative rotary displacements of said element and said guide about an axis parallel to said guide, while reducing frictional stresses in the sliding displacements, and means for controlling the pivoting displacements of said guide and said element with respect to said frame.

5. A combination according to claim 4 in which said guide is of cylindrical shape and said element is a sleeve coaxially surrounding said guide.

6. In a vehicle, the combination of a frame, an upright elongated guide pivoted to said frame about a substantially vertical axis, a wheel, a wheel stub axle, an element rigid with said stub axle slidably engaging said guide so as to permit relative sliding displacements of said element and said guide parallel to said guide, said guide and said element having surfaces opposite one another, rolling means cooperating with said surfaces for preventing relative rotary displacement of said element and said guide about an axis parallel to said guide while reducing frictional stresses in the sliding displacements, suspension means opposing said sliding displacements at least in one direction and mean for controlling the pivoting displacements of said guide and said element with respect to said frame.

7. In a vehicle, the combination of a frame, an upright elongated guide, a spindle element disposed directly under said guide and integral therewith pivoted to said frame, the axis of said spindle element forming a small angle with said guide, a wheel, a wheel stub axle, an element rigid with said stub axle slidably engaging said guide so as to permit relative sliding displacements of said element and said guide parallel to said guide, said guide and said element having surfaces opposite one another, rolling means cooperating with said surfaces for preventing relative rotary displacements of said element and said guide about an axis parallel to said guide while reducing frictional stresses in the sliding displacements, suspension means opposing said sliding displacements at least in one direction and means for controlling the pivoting displacements of said guide and said element with respect to said frame.

8. In a vehicle the combination of a frame, two upright elongated guides pivoted in said frame about substantially vertical axes, two wheels, a wheel stub axle connected to each of said wheels, two elements, each of which is rigid with one stub axle and slidably engages one of said guides so as to permit a relative sliding displacement of said element and the corresponding guide parallel to the latter, suspension means between each of said elements and said frame, rolling means cooperating with said elements on the one hand and said guides on the other hand for preventing a rotary displacement of said elements relatively to said guides about an axis parallel to said guides while reducing frictional stresses in the sliding displacements, means for controlling the pivoting displacements of said guides and said elements with respect to said frame, and a connecting rod interposed between said two elements.

9. A combination according to claim 1 in which said guide is of cylindrical shape and said element is a sleeve coaxially surrounding said guide.

10. A combination according to claim 6 in which said guide is of cylindrical shape and said element is a sleeve coaxially surrounding said guide.

11. In a device as claimed in claim 1, a sleeve between said element and guide, said sleeve having apertures therein, said rolling members being arranged in said apertures and thereby positioned by said sleeve.

GEORGES BROULHIET.